United States Patent [19]
Dabrio

[11] 3,923,024
[45] Dec. 2, 1975

[54] AIR METERING VALVE FOR ENGINE AIR INLET SYSTEM

[76] Inventor: John W. Dabrio, 14533 San Cristobal Drive, La Mirada, Calif. 90638

[22] Filed: Mar. 28, 1974

[21] Appl. No.: 455,554

[52] U.S. Cl. .............................. 123/119 B; 137/517
[51] Int. Cl.² ......................................... F02M 25/06
[58] Field of Search ................... 123/119 B; 137/517

[56] References Cited
UNITED STATES PATENTS

| | | | |
|---|---|---|---|
| 3,359,960 | 12/1967 | Pittsley | 123/119 B |
| 3,557,763 | 1/1971 | Probst | 123/119 B |
| 3,664,368 | 5/1972 | Sweeney | 123/119 B |
| 3,809,035 | 5/1974 | Winton | 123/119 B |

FOREIGN PATENTS OR APPLICATIONS

| | | | |
|---|---|---|---|
| 1,226,039 | 3/1971 | United Kingdom | 137/517 |
| 1,600,823 | 6/1970 | Germany | 137/517 |

*Primary Examiner*—Charles J. Myhre
*Assistant Examiner*—Sheldon Richter

[57] ABSTRACT

An air metering valve unit is connectible in an engine crankcase gas return duct, and includes a body having an air inlet, and control means including a valve element movable in the body in response to relatively decreased suction communicated to the valve unit via the air-fuel mixture stream supplied to the engine to increase air delivery via said inlet to said crankcase gaseous flow, and also movable in response to relatively increased suction communicated to the valve unit from said stream to decrease air delivery via said inlet to said crankcase gaseous flow.

2 Claims, 2 Drawing Figures

AIR METERING VALVE FOR ENGINE AIR INLET SYSTEM

BACKGROUND OF THE INVENTION

This invention relates generally to the attainment of better air-fuel mixture ratios in air-fuel streams delivered to internal combustion engine cylinders; more particularly, it concerns the unusually advantageous use of an air metering valve in the crankcase gas recycling path associated with an engine.

It is found that conventional engines normally burn or combust only 50 to 60 per cent of their gasoline supply, due primarily to inadequate metering of air or oxygen to the gasoline feed. As a result, when the mixture is brought up to flash point, there is often insufficient oxygen present to combine with the fuel molecules, so that not all the fuel can burn and release its energy. This deficiency is aggravated by recycling of crankcase gases to the air-fuel stream, as is currently advocated to reduce smog.

SUMMARY OF THE INVENTION

It is a major object of the invention to provide a solution to the above problem, and particularly in relation to the mechanics of recycling crankcase gases, advantage being taken of the latter to accomplish simultaneous metering of added air flow to the air-fuel mixture in conjunction with crankcase gas recycling to achieve simplicity of operation and assembly, i.e., minimum alteration of the engine configuration.

Basically, the invention is embodied in a combination that comprises:

a. a duct for delivering engine crankcase gas flow to said air-fuel mixture stream, and b. an air metering valve unit operatively connected in series with said duct and having a body providing a through passage to pass the crankcase gas flow through the body, c. the body also having an air inlet, and d. control means including a valve element movable in the body in response to relatively decreased suction communicated to the valve unit via said stream to increase air delivery via said inlet to said crankcase gaseous flow, and also movable in response to relatively increased suction communicated to the valve unit from said stream to decrease air delivery via said inlet to said crankcase gaseous flow.

As will be seen, the body typically defines an air flow chamber with an annular seat in the latter, the valve element comprising a self cleaning stopper movable in the chamber in response to suction variations communicated to the underside of the stopper; a compression spring in a flow port beneath the stopper urges it away from the seat in response to relatively decreased suction communication to the stopper; the stopper interfits with a perforated plate to guide stopper movement, the plate acting as an air filter; a contaminant trap is provided below the stopper; and a second metering valve unit is connected in the duct or hose to meter crankcase gas return flow in the manner to be described.

These and other objects and advantages of the invention, as well as the details of an illustrative embodiment, will be more fully understood from the following description and drawings, in which:

DRAWING DESCRIPTION

DETAILED DESCRIPTION

Figure 1:
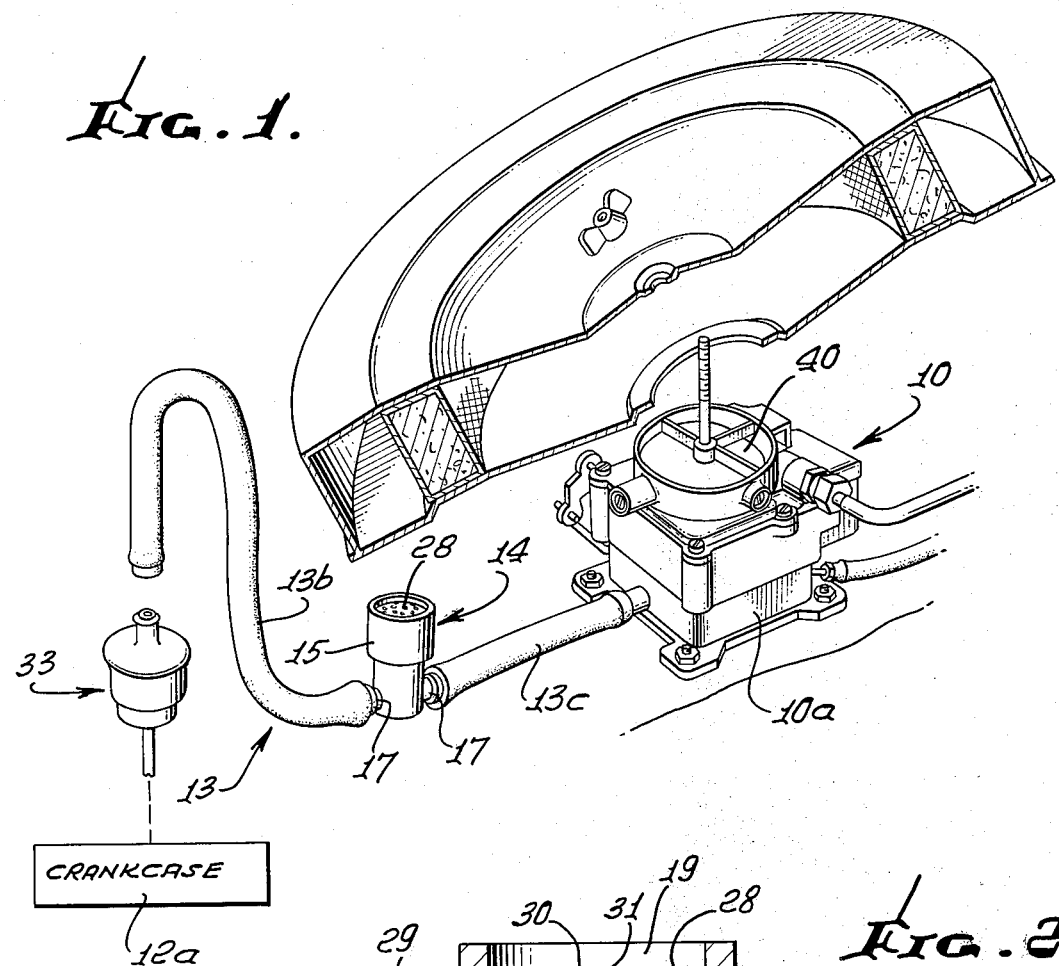
FIG. 1 is a perspective showing of a system incorporating the invention.
Figure 2:
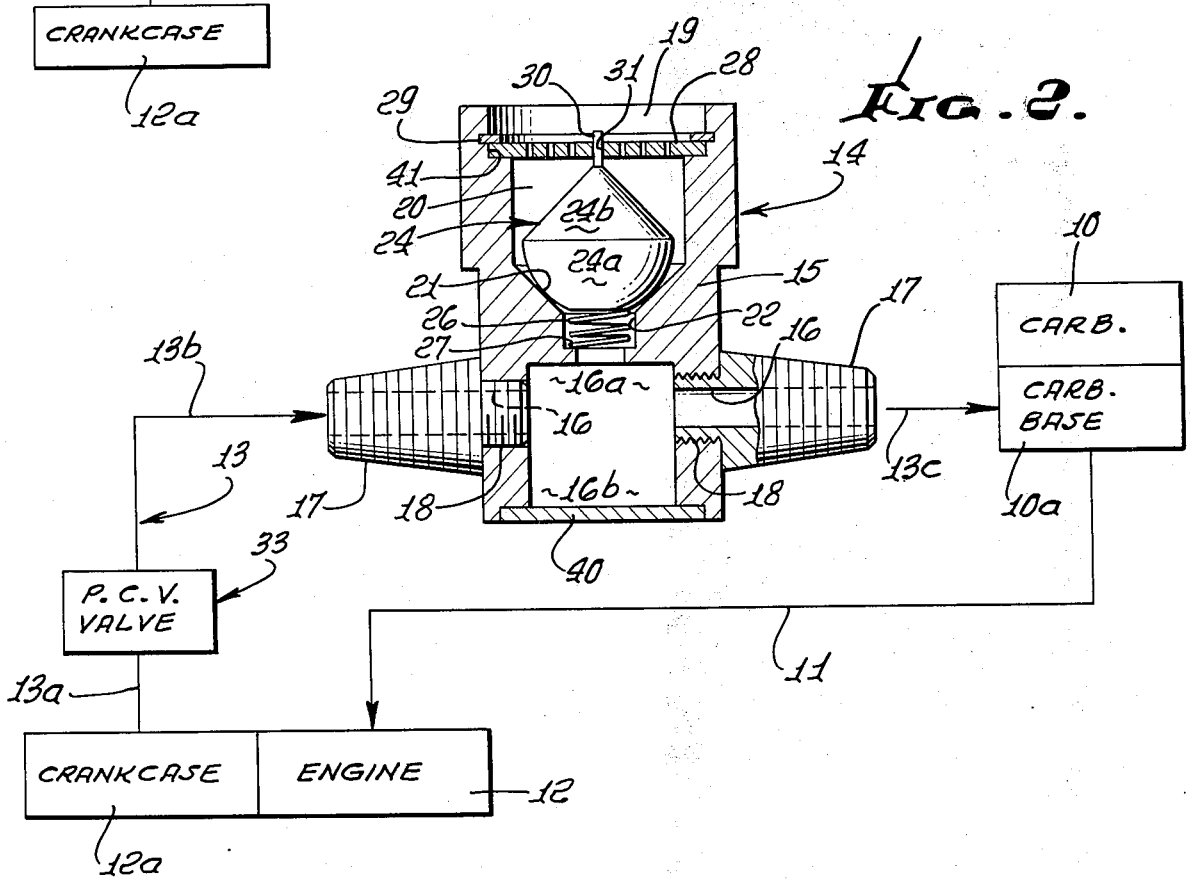
FIG. 2 is a vertical cross section through an air metering valve incorporating the invention.

In the drawings carburetor 10 conventionally delivers an air-fuel mixture stream via manifold 11 to an internal combustion engine 12. The engine includes a crankcase 12a, and a duct or hose 13 is connected between the crankcase and carburetor base 10a for recycling blow-by fumes (crankcase gas) to the air-fuel mixture stream.

In accordance with the invention, an air metering valve unit 14 is operatively connected in series with duct 13. Unit 14 includes an upright body 15 providing a horizontal through passage 16 to pass the crankcase gas flow through the body toward the carburetor. Passage 16 may in part be provided by tubular hose fittings 17 thread connected at 18 to the body, as shown, to receive the ends of duct or hose sections 13b and 13c.

Body 15 also has an air inlet 19 communicating with the passage 16 via an air flow chamber 20. The latter is downwardly tapered to provide an annular, frustoconical seat at 21, and a flow port 22 communicates between the lowermost extent of the chamber 20 and an enlargement 16a of the passage 16.

Further in accordance with the invention, control means is provided and includes a valve element movable in the body 15 in response to relatively decreased suction or vacuum communicated to the valve unit from the fuel-air gas stream to increase air delivery via the inlet 19 to the crankcase gas flow; also, the valve element is movable in response to relatively increased suction communicated to the valve unit from the fuel-air stream to decrease air delivery via the inlet to the crankcase gas flow. Relative opening of butterfly valve 40 in the carburetor serves to reduce such suction, and vice versa. Accordingly, at acceleration, at high engine speed and also when the engine is under load such as lugging up a grade, when such suction is reduced, and the air-fuel mixture is relatively rich, more air is admitted to the mixture stream via unit 14; conversely, at normal engine speeds when the air fuel mixture is closer to ideal (15 lbs. of air per lb. of fuel) less or no air is admitted via unit 14 to the mixture stream via the crankcase gas return flow, the suction to valve unit 14 being relatively increased. This also occurs at idle.

In the illustrated embodiment, the valve element comprises a stopper 24 movable up and down in the chamber 20, i.e., to annularly engage seat 21 and plug the air inlet in response to increased suction communicated via duct 13c, passage 16 and port 22 to the underside of the stopper. A compression spring 26 in port 22 is shouldered at 27 and urges the stopper in an upward direction away from seat 21 in response to relatively reduced suction communicated to the stopper via the flow port.

It will be noted that the stopper has an annularly convex or hemispherical lower portion 24a to engage the seat, and an upwardly tapering upper portion 24b to be swept by air entering the chamber 20 via inlet 19. Accordingly, the stopper is self-cleaning, in that entering air sweeps it clean of any particulate or other contaminant, so that the seat 21 and surface 24a remain in cleansed condition for effective annular seating to close the valve unit. In this regard, the lowermost portion of the enlargement 16a defines a trap zone 16b below the level of the horizontal through passage and directly below port 22 to receive and trap any heavy contaminant such as oil in the crankcase gas flow being returned to the air-fuel stream. Bottom plate 40 is removable, as desired, to clean trap zone 16b.

A perforated top plate 28 extends across inlet 19 and is carried in counterbore 41 and retained by snap ring 29, to filter larger contaminant from the entering air. A central pin extension 30 on the stopper guides in a central bore 31 in that plate to guide stopper up and down movement in a vertical direction, relative to the seat. Accordingly, removal of plate 28 facilitates removal of the stopper for inspection, whenever desired.

A second metering valve unit 33 (positive crankcase ventilation valve, or PCV valve) is connected in duct 13, i.e., between duct sections 13a and 13b as shown. Unit 33 operates to increase crankcase gas delivery to the fuel-air stream in response to decreased suction communicated from that stream to the unit 33, and to decrease crankcase gas delivering in response to relatively increased suction communicated to the unit 33.

Device 14 serves to lean out otherwise rich fuel-air mixtures to a normal mixture of not more than 14 weight parts of air to 1 weight part of fuel.

Stopper 24 is free to seat in slightly differing lateral positions, but it is self-centering, and such lateral movement aids cleansing of seat 21.

I claim:

1. In a system for metering gas delivery to the air-fuel mixture stream supplied to an internal combustion engine, said system including a duct to deliver engine crankcase gas flow to said stream, an air metering valve unit comprising
    a. a body operatively connectible in series with said duct and providing a through passage to pass the crankcase gas flow through the body,
    b. the body also having an air inlet, and
    c. control means including a valve element movable in the body in response to relatively decreased suction communicated to the valve unit via said stream to increase air delivery via said inlet to said crankcase gaseous flow, and also movable in response to relatively increased suction communicated to the valve unit from said stream to decrease air delivery via said inlet to said crankcase gaseous flow,
    d. said body defining an air flow chamber, there being an annular seat in said chamber, the valve element comprising a stopper movable in the chamber to annularly engage said seat in response to said increased suction commmunication to said stopper, said chamber including a flow port communicating between said through passage and said stopper, there being a compression spring in said flow port for urging the stopper in a direction away from the seat in response to said relatively decreased suction communication to the stopper via said flow port, the stopper having an annularly convex lower portion to engage the seat, and an upwardly tapering, cone shaped upper portion to be swept by air entering the chamber via said inlet, the chamber extending upright above the level of said through passage, and
    e. a perforated plate extending across said inlet and removably carried by said body, there being interfitting guide means on the plate and stopper to guide stopper movement in a vertical direction toward and away form said seat so that said stopper remains substantially centered relative to said seat but is also free to seat in slightly differing horizontal positions, said guide means including a pin projecting upwardly from the apex of said cone shaped upper portion of the stopper and a central bore in the plate slidably receiving the pin.

2. The system of claim 1 wherein the body defines a contaminant trap zone below the level of said through passage and communicating therewith, there being a downwardly removable closure at the bottom of said trap zone and vertically aligned with said valve element.

* * * * *